United States Patent [19]

Spontelli

[11] 4,076,286
[45] Feb. 28, 1978

[54] TUBE FITTING

[75] Inventor: Leonard P. Spontelli, Seven Hills,, Ohio

[73] Assignee: Crawford Fitting Co., Solon, Ohio

[21] Appl. No.: 330,679

[22] Filed: Feb. 8, 1973

Related U.S. Application Data

[63] Continued of Ser. No. 134,154, Apr. 15, 1971, abandoned.

[51] Int. Cl.² ............................................. F16L 19/08
[52] U.S. Cl. .............................. 285/341; 29/157 R; 29/520; 285/382.7
[58] Field of Search .................. 285/382.7, 341, 342, 285/343; 29/237, 282, 157 R, 520

[56] References Cited

U.S. PATENT DOCUMENTS

| | | | |
|---|---|---|---|
| 3,215,457 | 11/1965 | Teeters | 285/382.7 X |
| 3,402,949 | 9/1968 | Mahoney | 285/382.7 X |
| 3,445,128 | 5/1969 | Teeters | 285/382.7 X |
| 3,695,647 | 10/1972 | Pugliese | 285/341 |
| 3,736,008 | 5/1973 | Crawford | 285/342 |

FOREIGN PATENT DOCUMENTS 1,256,108   2/1961   France ............................... 285/342

*Primary Examiner*—Thomas F. Callaghan
*Attorney, Agent, or Firm*—Fay & Sharpe

[57] ABSTRACT

A tube fitting for a large diameter tube comprises a coupling body having a bore, a counterbore adapted to receive such tube, and a rearwardly opening generally frusto-conical camming mouth adapted to surround the tube when inserted in the coupling body. A front and back ferrule are provided which are adapted to be snugly received upon the tube. The front ferrule is defined by a nose portion adapted to engage the camming mouth. The rearward end of the front ferrule is provided with a camming mouth adapted to be engaged by a nose portion of the back ferrule. The rearward end of the back ferrule is provided with a back face adapted to be engaged by a complementary surface of a coupling nut which is threadedly engaged with the coupling body. The relationship of the parts is such that the axial length of the front ferrule has a minimum value which is a function of the tube outside diameter so that the wave induced in the tube by the front ferrule on make-up of the fitting is not encountered by the nose portion of the back ferrule.

12 Claims, 5 Drawing Figures

INVENTOR.
LEONARD P. SPONTELLI
BY
*Fay, Sharpe & Mulholland*
ATTORNEYS

INVENTOR.
LEONARD P. SPONTELLI
BY
Fay, Sharpe & Mulholland
ATTORNEYS

TUBE FITTING

This is a continuation of application Ser. No. 134,154, filed Apr. 15, 1971 and now abandoned.

BACKGROUND OF THE INVENTION

This invention relates to a ferrule type fitting for large diameter tubes.

Ferrule type fittings have been known to the art for many years. U.S. Pat. No. 3,103,373 to Lennon et al. is an example of a commercial tube fitting in widespread use today. Tube fittings of the type shown in U.S. Pat. No. 3,103,373, however, have heretofore been used in applications where the tube is 1 inch or less in diameter. The design of tube fittings over 1 inch has been found difficult to successfully achieve because of an apparent need for understanding of design factors not apparent in small diameter fittings.

Experimentation with large diameter tubes and fittings of the type shown in the Lennon U.S. Pat. No. 3,103,373 has shown that where a leak was found to exist it was most often caused by the interaction of the back ferrule with the wave induced in the tube by the front ferrule on make-up. Specifically, in such cases the deformation of the tube caused by the front ferrule interfered with effective sealing and gripping of the tube by the back ferrule, causing the overall sealing and gripping action of the fitting to be impaired. The problem became particularly acute in connection with thin wall tubing.

As the result of a close examination of the problem, it has been found that a physical relationship exists between the axial length of the wave or indentation induced in a tube by a ferrule and the inside and outside diameters of the tube. This relationship is such that with all the conditions being equal, a ferrule will induce a longer wave in a thin wall tube than in a standard or heavy wall tube. Further, it has been found that the axial length of the wave so induced will vary within limits from a very small percentage of O.D. (where O.D. is the outside diametr of the tube) for heavy wall tubes to one-half of O.D. for thin wall tubes. That is, when the nose of a ferrule is deformed inwardly into engagement with a tube, it forms a wave or indentation in the tube having an effective axial length equal to one-half the outside diameter of the tube for very thin wall tubes and less for heavy wall tubes.

Having determined that the axial length of the wave or indentation induced in a tube by a ferrule is related to the tube O.D. and the outside and inside diameter ratio of the tube, it became possible to predict that:

a. as the outside diameter of the tube was increased, and the ratio of the outside diameter to inside diameter remained constant, the axial length of the wave induced in the tube by a ferrule would correspondingly increase;

b. as the wall thickness of the tube was decreased, with the outside diameter of the tube remaining constant, the axial length of the wave induced in the tube by a ferrule would correspondingly increase.

For a clear understanding of the relationship of the length of the wave in the tube with respect to the tube O.D. and the ratio of tube O.D. to tube I.D. the effect of the laws governing this action are given in paragraphs (a) and (b) above.

It must also be recognized that the ratio of tube O.D. to tube I.D. (O.D./I.D.) approaches a limit of 1 when I.D. approaches O.D. and reaches infinity when I.D. diminishes to zero.

In order that a fitting be practical it must function against a range of tube O.D. to I.D. ratios with ferrule spacing being largest when I.D. approaches O.D. for a ratio of 1 for an infinitely thin wall.

Therefore thin wall applications impose a design consideration in regard to front ferrule length and ferrule spacing to avoid wave interaction.

The nature of the laws governing wave action have as one of its factors the O.D. to I.D. ratio. Because the O.D. to I.D. ratio cannot be less than 1 there is an optimum ferrule spacing that need not be exceeded. Shorter spacing will secure useful fitting performance dropping from optimum to lesser and lesser reliability as spacing is decreased.

When designing for a given size tubing and assuming thin wall tubing approaching a O.D. to I.D. ratio of 1, ferrule spacing is then governed only by the single variable of tube diameter resulting in a simple ratio relationship to tube O.D. for ductile materials.

The importance of understanding the relationship to tube dimensions of the axial length of the wave induced in the tube by the ferrule will be appreciated when it is understood that effective sealing and gripping of the tube by the ferrule is, in itself, dependent upon the nature of the wave thus induced.

In large diameter fitting designs where a leak occurred it was seen that the axial length of the front ferrule of the fitting was relatively short as compared to the axial length of the wave induced in the thin wall tube by the front ferrule. As a consequence, the wave induced in the tube by the front ferrule extended into the vicinity of the nose portion of the back ferrule, with the result that effective sealing of the front ferrule and gripping of the tube by the back ferrule was impeded. It was noted that the wave in the tube induced by the back ferrule interacted with the wave in the tube produced by the front ferrule tending to form one wave in the tube instead of two.

The result was to impair the grip of the back ferrule which is greatest when it produces a wave independent of the front ferrule wave. Under the above condition where the front ferrule was short the back ferrule tended to nose under the front ferrule thus pulling the tube away from the front ferrule to the detriment of the sealing function of the front ferrule.

The invention in its broadest sense is directed to a multiple ferrule-type fitting adapted for use with large diameter tubes and wherein the axial length of one ferrule has a minimum value which is a function of the outside diameter of the tube such that upon make-up of the fitting the wave induced in the tube by that ferrule does not encounter the nose portion of any other ferrule(s).

BRIEF DESCRIPTION OF THE INVENTION

Briefly described, this invention comprises a coupling body having a bore, a counterbore for receiving a tube, and a rearwardly opening, generally frusto-conical camming mouth extending from the counterbore and adapted to surround a tube when inserted in the coupling body. A set of ferrules is provided adapted to be snugly received upon the tube one behind the other. The front ferrule includes a bore and a nose portion defined by a tapered external forward surface adapted to engage the camming mouth. The rearward end of the front ferrule is provided with a camming mouth adapted to be engaged by a nose portion of the back ferrule. The rearward end of the back ferrule is provided with a back face adapted to be engaged by a complementary surface of a coupling nut which is threadedly engaged with the coupling body. The relationship of the parts is such that the axial length of the front ferrule has a minimum value which is a function of the tube outside diameter so that on make-up of the fitting the wave induced in the tube by the front ferrule is not encountered by the nose portion of the back ferrule.

THE INVENTION DESCRIBED

Figure 1:
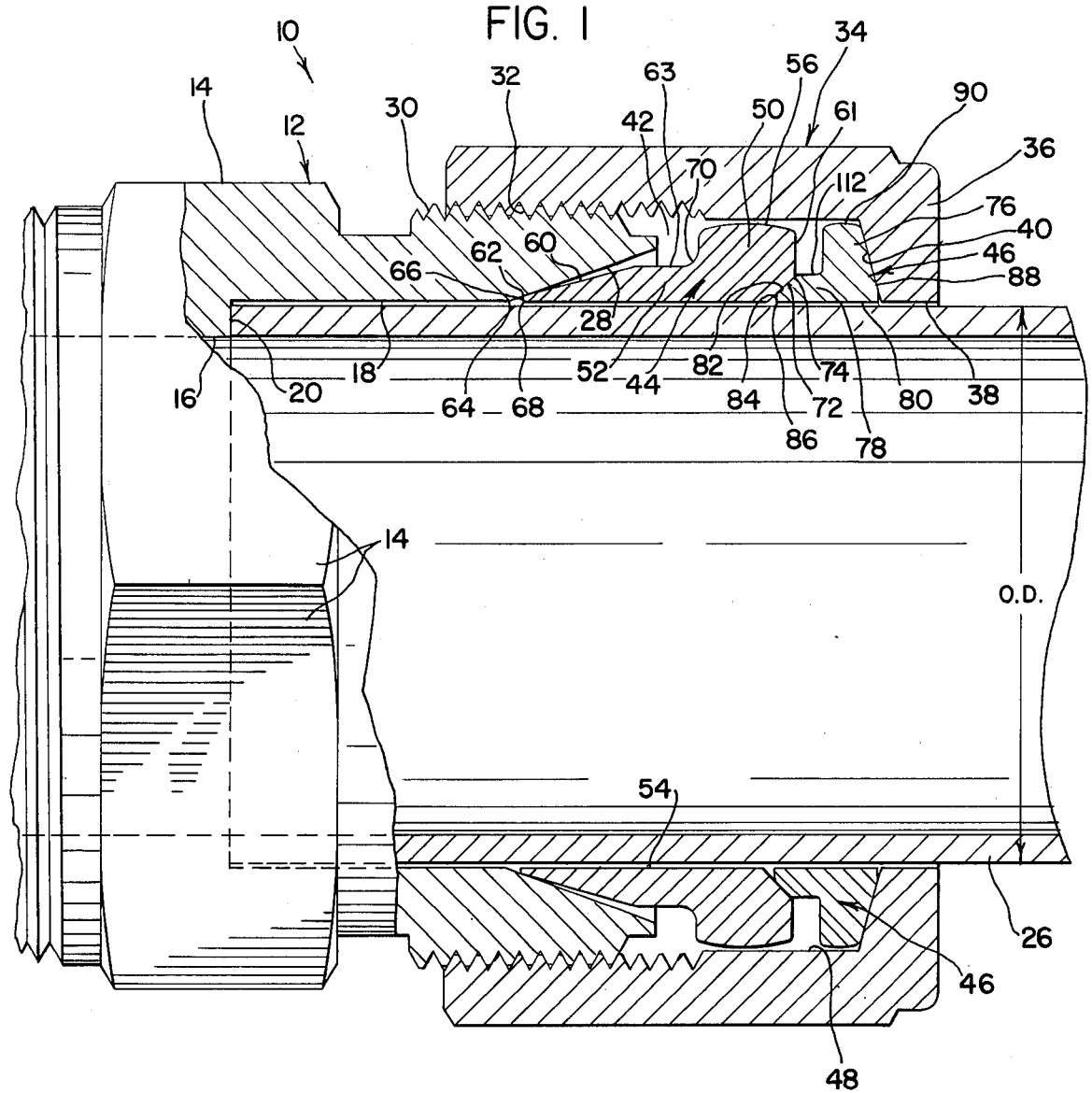
FIG. 1 is an elevational, sectional view of a tube fitting embodying the principles of this invention in which the coupling nut is in finger tight relationship with the male thread on the coupling body.
Figure 4:
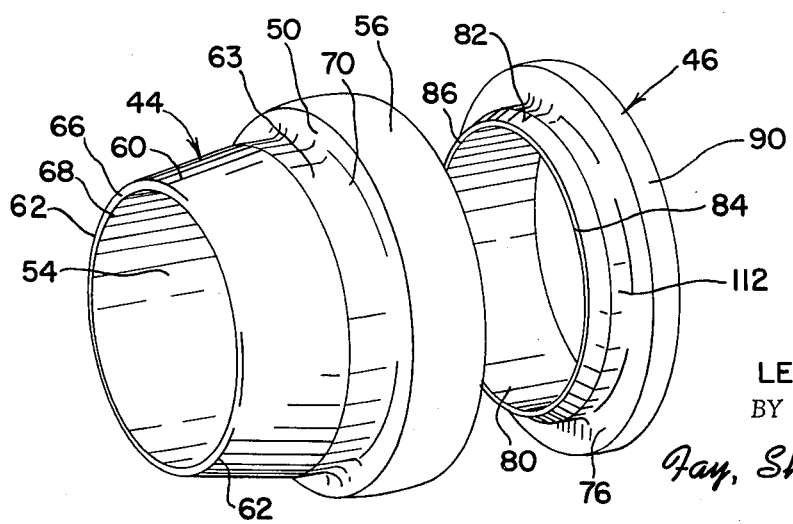
FIG. 4 is an exploded perspective view, in reduced scale, of the detached ferrules.

Referring now more particularly to the drawing, FIG. 1 shows a tube fitting 10 embodying the principles of this invention. The fitting includes a coupling body 12 which may be provided intermediate its ends with tool pads 14 or other wrench engaging surfaces. Extending longitudinally through the coupling body 12 is a substantially cylindrical bore indicated generally at 16. Bore 16 is provided at one end with a coaxial substantially cylindrical counterbore 18 having a bottom forming a radially extending shoulder 20. As is shown in FIG. 1, shoulder 20 extends radially inwardly a relatively short distance where it intersects the wall defining bore 16.

The counterbore 18 at its outer terminal portion is provided with a coaxial annular tapered or frusto-conical camming mouth 28 formed at a predetermined half-angle with respect to its axis.

Throughout the description of the invention, the angle defined by a frusto-conical surface in section with respect to its axis will be referred to as the half-angle. Half-angle is thus to be differentiated from the full or included angle (defined by the complete frusto-conical surface in section), which is twice the half-angle.

In the embodiment of FIG. 1 the camming mouth 28 is formed on a half-angle of from about 15° to about 25° with respect to the axis of counterbore 18.

The coupling body 12 is provided, on the end portion thereof in which the camming mouth 28 is defined, with thread means 30 for mating engagement with similar thread means 32 provided in coupling nut 34. The end of the coupling nut 34 opposite the thread 32 is formed with an internal annular flange 36 defining a generally cylindrical opening 38 coaxial with and of approximately the same diameter as the counterbore 18.

The face of flange 36 opposed to the camming mouth 28 defines a frusto-conical driving or thrust surface 40 coaxial with both the camming mouth 28 and counterbore 18.

It will be observed that the annular tapered camming mouth 28, the internal surfaces of coupling nut 34 and the external surface of tube 26 together define an annular chamber 42 within which the front and back ferrules 44 and 46 respectively are received.

Front Ferrule

Figure 3:
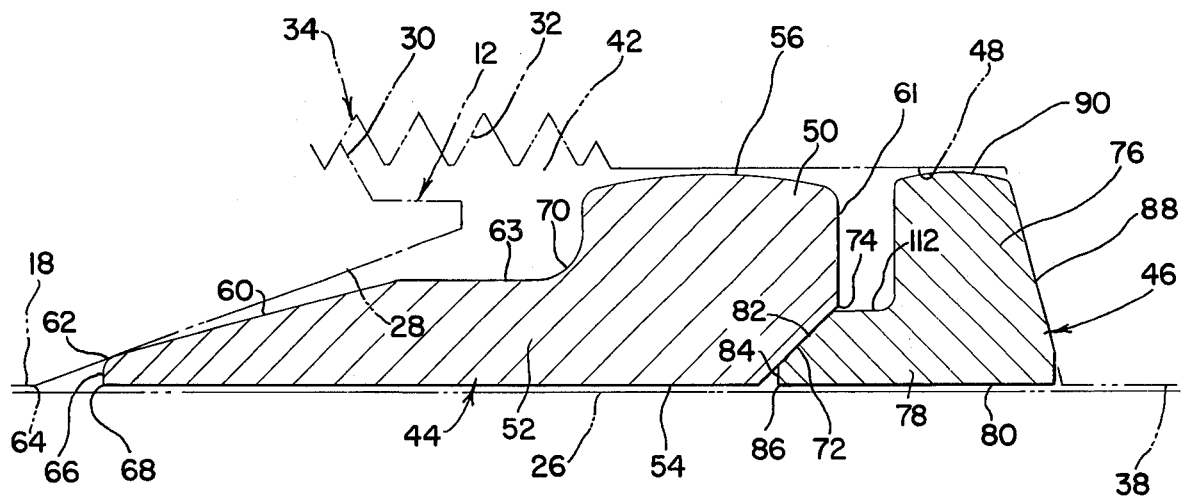
FIG. 3 is an elevational, sectional view, in enlarged scale of the front and back ferrules of this invention.

As may be seen from FIGS. 1 and 3, the front ferrule 44 is defined by a body portion 50 and a nose portion 52. A front ferrule bore 54 is defined in the front ferrule and is of a diameter slightly larger than the external diameter of tube 26 such that the front ferrule may be snugly received upon the tube as shown at FIG. 1. The front ferrule body portion 50 is substantially in the form of a right circular cylinder having an outside diameter slightly less than the diameter of the annular internal surface 48 of the coupling nut 34. A slight radial clearance is thus defined between the front ferrule 44 and the internal surface 48 of the coupling nut 34.

In the preferred embodiment of this invention, a slight crown or radius is provided on the outer surface 56 of body portion 50. The slight radius or convexity so imparted to the body portion at the surface 56 renders less difficult the insertion of the front ferrule into the coupling nut. Thus, in the preferred embodiment, the outer surface 56 of the front ferrule is actually convex in shape although, since the radius is relatively large and thus the degree of convexity slight, the outer surface 56 may be described as substantially straight in section.

The right circular forwardly converging frusto-conical nose portion 52 of front ferrule 44 is defined by a tapered external forward surface portion 60 and an intermediate cylindrical portion 63. The surface portion 60 terminates at the forward end of the ferrule with a curved apical zone 62 seated against the camming mouth 28 in initial nonpressure contact along a line of predetermined diameter adjacent to but spaced from the smaller end 64 of camming mouth 28. The curved apical zone 62 is joined to the wall defining bore 54 of the front ferrule by a generally radially extending front face 66. A corner 68 is defined at the intersection of the front face 66 and the wall defining the bore 54.

Surface portion 60 defines a half-angle with respect to the axis of counterbore 18 which is less than the half-angle defined by the camming mouth 28. In the illustrated embodiment of the invention, surface portion 60 defines a half-angle of from about 10° to about 20° with respect to the axis of counterbore 18. As has previously been pointed out, camming mouth 28 defines a half-angle of from about 15° to about 25° with respect to the axis of counterbore 18. It is desirable to maintain a half-angle differential of from about 5° to about 15° between the cooperating tapered surfaces of the front ferrule and the camming mouth.

As has been noted, nose portion 52 of the front ferrule 44 is in the form of a tapered external forward surface portion 60 and an intermediate cylindrical portion 63. Cylindrical portion 63 is joined to body portion 50 by a generally concave annular surface 70.

A radial base 61 is provided on body portion 50. A coaxial rearwardly opening generally frusto-conical surface or camming mouth 72 joins the radial base 61 of the front ferrule with the wall defining bore 54 of the front ferrule.

It will be observed from FIG. 1 that specific relationships exist between various surfaces of the front ferrule 44. For example, the radial extent of surface 72 at its intersection 74 with radial base 61 (i.e. the perpendicular distance between the point of intersection 74 and the wall defining bore 54) is substantially less than one-half the radial thickness of body portion 50 or, alternately described, substantially less than one-half the greatest difference between the inner and outer radii of body portion 50. It will further be observed from FIG. 1 that the axial length of body portion 50 (as measured between radial base 61 and surface 70) is considerably less than the axial length of nose portion 52 (as measured between front face 66 and surface 70). The reason for the relatively long nose portion 52 will become more apparen as the description proceeds.

Furthermore, the wall thickness of the nose portion 52 at cylindrical portion 63 is approximately one-half the wall thickness of the body portion 50 or, alternately described, about one-half the greatest difference between the inner and outer radii of the body portion. The radial extent of the front face 66 of nose portion 52 is normally less than the radial extent of camming mouth 72 at its intersection 74 with radial base 61.

The relationships noted above should not be considered limiting to this invention. The front ferrule may take other forms depending upon various conditions.

Back Ferrule

Attention will now be directed to the back ferrule 46 as shown in FIGS. 1 and 3. Back ferrule 46 is comprised of a body portion 76 and a nose portion 78. A back ferrule bore 80 extends through both the body portion and the nose portion of the ferrule. As with the front ferrule bore 54, back ferrule bore 80 has a diameter that is slightly larger than the external diameter of tube 26 such that the back ferrule may be snugly received upon tube 26 adjacent the front ferrule and rearwardly thereof. Body portion 76 of back ferrule 46 is substantially of a right circular cylindrical shape the outer diameter of which is about the same as the outer diameter of body portion 50 of front ferrule 44. In the illustrated form, the outer surface 90 of body portion 76 is defined on a radius similar to the outer surface 56 of front ferrule 44.

Like the surface 56, the outer surface 90 functions to provide proper alignment of the ferrule in the coupling nut as well as to reduce the possibility that the ferrule will jam in the coupling nut during either assembly or disassembly of the fitting.

The greatest wall thickness of nose portion 78 is substantially less than one-half the greatest difference between the inner and outer radii of body portion 76. Stated another way, the greatest wall thickness of nose portion 78 is substantially less than one-half the wall thickness of the body portion 76.

The forward end of nose portion 78 is defined by an external forwardly converging generally frusto-conical surface 82 adapted to be received within camming mouth 72 and at its greatest diameter has a radial extent about the same as the radial extent of such camming mouth. Reasonable variations in this relationship are permissible, however. The half-angle defined by these surfaces may coincide or may define a taper difference of as much as 15° or more depending upon various conditions. In any event, camming mouth 72 will ordinarily define a half-angle ranging from about 30° to about 50° with respect to the axis of counterbore 18. Surface 82 is joined to the wall defining bore 80 of the back ferrule by a generally radially extending front face 84. A corner 86 is defined at the intersection of the front face 84 and the wall defining bore 80.

The rearward end of the back ferrule 46 is provided with a generally frusto-conical rearwardly converging back face 88 adapted to be engaged by the frusto-conical driving or thrust surface 40 of the coupling nut 34. In the embodiment of the invention as shown in FIG. 1, the thrust surface 40 and the back face 88 are generally disposed at a half-angle of from about 60° to about 90° with respect to the axis of counterbore 18. Preferably, the half-angle will be somewhat less than 90°. It is desirable to maintain a zero degree half-angle differential between the cooperating surfaces of the coupling nut and the back ferrule although a half-angle differential of up to 5° may be provided as the respective half-angles need not necessarily coincide.

Specific relationship of the various surfaces of the back ferrule 46 will be evident from FIG. 1. As has previously been noted, the radial thickness of the nose portion 78 at the intermediate cylindrical portion 112 is substantially less than one-half the radial thickness of the body portion 76. The axial length of the nose portion 78 is about the same or slightly shorter than the axial length of the body portion 76.

The wall thickness of the body portion 76 is approximately equal to the wall thickness of the body portion 50. Back face 88 defines a relatively large surface which is contacted by thrust surface 40 of coupling nut 34. The working stress imposed on the ferrule 46 by the coupling nut is thus spread over a relatively large area which serves to reduce distortion and galling of the ferrule and coupling nut during make-up of the fitting.

The nose portion 78 of back ferrule 46 is relatively short as compared to the nose portion 52 of front ferrule 44 to avoid buckling associated with high compressive forces.

The relationships noted above should not be considered limiting to this invention. The back ferrule may take other forms depending upon various conditions.

Prior Art Ferrules Compared

A brief comparison will now be made of the front and back ferrules of this invention and the front and back ferrules of U.S. Pat. No. 3,103,373 to Lennon et al. Whereas the front ferrule 42 of Lennon U.S. pat. No. 3,103,373 is generally in the configuration of a hollow right circular conical frustum, front ferrule 44 of this invention is defined by a substantially cylindrical body portion (having a slight convexity in the outer surface thereof) and a relatively long nose portion including a forward surface portion 60 and an intermediate cylindrical portion 63 for a purpose to be described more fully hereafter. The body portion 50 of the present invention serves as a strengthening flange by adding a large mass to the ferrule thus diminishing any tendency of the rear portion of the ferrule to flare outwardly under high axial forces imposed during make-up of the fitting.

Distinctions between back ferrule 46 of this invention and back ferrule 44 of Lennon U.S. Pat. No. 3,103,373 will now be described. Unlike ferrule 44 of Lennon, the body portion 76 of the back ferrule 46 of this invention is significantly thicker than nose portion 78 and, in fact, is of a mass approximating that of the body portion 50 of front ferrule 44. The net effect of the greatly enlarged body portion of the back ferrule is to present a rather large driving surface to the coupling nut 34 so as to impart axial thrust to the front ferrule. In addition, the enlarged body portion provides for a distribution of forces over a relatively large area of the ferrule and the coupling nut thus reducing galling of these parts.

Ferrule-Tube Relationship

A physical relationship exists between the axial length of the wave or indentation induced in a tube by a ferrule and the inside and outside diameters of the tube. As previously noted, this relationship is such that with all conditions being equal, a ferrule will induce a longer wave in a thin wall tube than in a heavy wall tube. Similarly, a ferrule will induce a longer wave in a tube having a large outside diameter than in a tube having a small outside diameter.

It has been found that the effective axial length of the wave so induced in the tube will vary approaching a limit of one-half of O.D. for thin wall tubes.

The relationships noted above are not exact but vary slightly due to factors which come into play to modify the length of the wave such as the physical properties of the tube, etc.

Given a specific tube material and the tube O.D. and I.D. dimensions effective wave action can be predicted.

Since it is known generally that the axial length of a wave induced by a ferrule will increase as the outside diameter of the tube increases (the ratio of outside diameter to inside diameter remaining constant), one can gain an appreciation of the significance of the problem in designing a ferrule type fitting for a 2 inch tube as compared to that of designing a fitting for an ⅛ inch tube. Similarly, since the axial length of the wave induced in a tube increases as the wall thickness of the tube decreases (the outside diameter of the tube remaining constant), it can be appreciated that the design of a fitting adapted to receive a thin wall tube will necessarily differ from that where the fitting is adapted to receive a heavy wall tube.

Having recognized general relationships which exist for wave shape verses tube O.D. and O.D./I.D. ratios it is possible to design a multiple ferrule-type fitting for large diameter tubes that will achieve the high sealing and griping standards now known to smaller diameter tube fittings.

Figure 2:
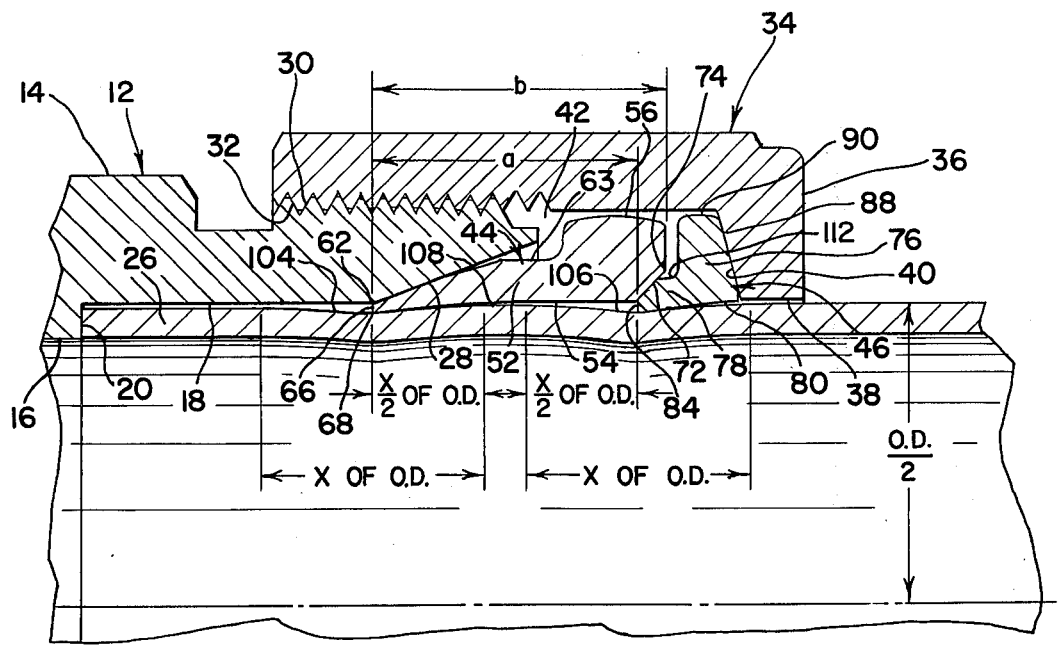
FIG. 2 is a fragmentary view, in longitudinal section, of the tube fitting embodying the principles of this invention, and showing the relative positions of the components when make-up is complete.

Referring to FIG. 2, it will be seen that the wave 104 induced in the tube 26 by the front ferrule 44 has an effective axial length equal to X of O.D. (where O.D. is the outside diameter of the tube). Similarly, the wave 106 induced in the tube by the back ferrule 46 has an effective axial length equal to X of O.D. As will be observed in FIG. 2, the axial distance from the midpoint of either wave 104, 106 to the end of the respective wave is approximately equal to X/2 of O.D.

It will be observed from FIG. 2 that there is an intermediate tube portion 108 between the respective waves 104, 106. Tube portion 108 represents a section of the tube between the waves which has an outside diameter approximately equal to the basic tube outside diameter.

Since the axial length of the wave 104 is a function of tube diameter and not the axial length of the ferrule 44 itself, it can be appreciated that if ferrule 44 of FIG. 2 were shortened a condition could be reached wherein the wave 104 could extend into the area of the camming mouth 72 so as to be encountered by the nose portion 78 of the back ferrule. If this condition should be reached, two undesirable factors come into play:

a. The nose portion 78 of the back ferrule will tend to wedge under the rear portion of the front ferrule causing the tube to pull away from the front ferrule, thus diminishing effective sealing of the tube by the front ferrule and aggravating the normally difficult seating problem associated with make-up;

b. Effective gripping of the tube by the back ferrule will be impeded, since, at the time of deformation of the nose of the back ferrule during make-up of the fitting, the external surface of the tube will be pulled away from the nose portion of the back ferrule by the front ferrule. In the worst case a downward slope is placed forward of the rear ferrule nose destroying its grip.

The adverse conditions outlined above, as the result of the nose portion of the back ferrule encountering the wave induced in the tube by the front ferrule, have been identified as the source of the problem wherein prior art fittings have leaked and failed to retain tubing when large diameter tubes have been used.

Having identified the source of the problem, it became known that an essential relationship of the front ferrule to the tube is that the ferrule have sufficient axial length such that the wave induced in the tube by the front ferrule does not extend into the rear portion of the front ferrule so as to be encountered by the nose portion of the back ferrule. Stated another way, it became known that the front ferrule should be of sufficient axial length such that the wave induced in the tube by the front ferrule cannot interact with the wave induced in the tube by the back ferrule.

Referring now to FIG. 2, the distance "a" is shown which is the spacing of the midpoints of the waves 104, 106. In order to satisfy the condition that wave 104 will not interact with wave 106, the distance "a" must have a minimum value of X/2 of O.D. plus X/2 of O.D. or X of O.D. It can be appreciated that while the distance "a" may have a value in excess of X of O.D. (thereby defining an intermediate tube portion 108 as shown in FIG. 2) such value may not be less than X of O.D. if the waves 104, 106 are to be separate and distinct.

As will be described more fully hereafter the precise value of X may vary between limits depending upon tube O.D. and the thickness of the tube wall.

As a practical consideration, however, the distance "a" as shown in FIG. 2 is not a standard dimension commonly used with respect to a ferrule. Rather, the axial length of the entire ferrule or the distance "b" as shown in FIG. 2 is the dimension more commonly used with respect to a ferrule. Since the distances "a" and "b" differ by an amount equal to the axial extent of the camming mouth 72, and since the axial extent of the camming mouth is relatively small as compared to the distance "b", it is more practical to define the minimum axial length of the front ferrule itself as being equal to the minimum distance "a". The minimum axial length (distance "b") of the front ferrule is thus considered to be X of O.D. while in the preferred embodiment as shown in FIG. 2 such length will exceed X of O.D. It should be understood, however, that the precise minimum value of the axial length of the front ferrule necessary to insure the establishment of a fluid tight seal must be calculated with respect to the distance "a" as shown in FIG. 2.

In addition to the relationship just described (between the axial length of the front ferrule and the outside diameter of the tube), there is a further consideration that must be taken into account in the design of fittings for large diameter tubes. This further consideration relates to the fact that as the tube outside diameter increases the O.D./I.D. ratio normally decreases (where I.D. is the internal diameter of the tube).

It should be noted at this point that tubing O.D. and I.D. are related by the following formula:

Tube O.D. equals $2t$ plus tube I.D. where $t$ equals wall thickness in inches.

As an example, a 3/16 inch tube having an outside diameter of 0.1875 inches and a wall thickness of 0.020 inches will have an O.D./I.D. ratio of approximately 1.27. Correspondingly, a ¾ inch tube having an outside diameter of 0.750 inches and a wall thickness of 0.049 inches will have an O.D./I.D. ratio of 1.15. A 1 inch tube having an outside diameter of 1.000 inches and a wall thickness of 0.065 inches will have an O.D./I.D. ratio of 1.15. Table 1 summarizes data for various fitting sizes up to 2 inches.

Table 1

| Tube O.D. | | Thin Wall (thickness) | Heavy Wall (thickness) | O.D. (thin I.D. wall) | O.D. (heavy I.D. wall) |
|---|---|---|---|---|---|
| 3/16" | (.1875) | .020 | .049 | 1.27 | 2.10 |
| 1/4" | (.250) | .020 | .065 | 1.19 | 2.08 |
| 5/16" | (.3125) | .028 | .065 | 1.21 | 1.72 |
| 3/8" | (.375) | .028 | .095 | 1.17 | 2.02 |
| 1/2" | (.500) | .049 | .095 | 1.23 | 1.61 |
| 5/8" | (.625) | .049 | .109 | 1.18 | 1.53 |
| 3/4" | (.750) | .049 | .109 | 1.15 | 1.41 |
| 7/8" | (.875) | .049 | .120 | 1.13 | 1.38 |
| 1" | (1.000) | .065 | .188 | 1.15 | 1.61 |
| 1 1/4" | (1.250) | .065 | .188 | 1.11 | 1.43 |
| 1 1/2" | (1.500) | .065 | .188 | 1.10 | 1.33 |
| 2" | (2.000) | .083 | .188 | 1.09 | 1.23 |

From Table 1 it will be observed that where the outside diameter of a tube becomes relatively large, the difference between the inside diameter and the outside diameter will be relatively small and thus the O.D./I.D. ratio will approach 1.

The significance of a decreasing O.D./I.D. ratio may be more fully understood when it is observed that the axial length of the wave induced in a tube by a ferrule increases as the O.D./I.D. ratio decreases. Thus, where the axial length of the wave induced in a tube increases (due to the fact that the O.D./I.D. ratio decreases) without provision being made for a consequent increase in the axial length of the ferrule itself, the leakage and gripping problems described previously are likely to occur.

The selection of a fitting front ferrule length for a large diameter tube thus must take into account three important factors:

a. The outside diameter of the tube,
b. the O.D./I.D. ratio of the tube, and
c. tube material.

Figure 5:
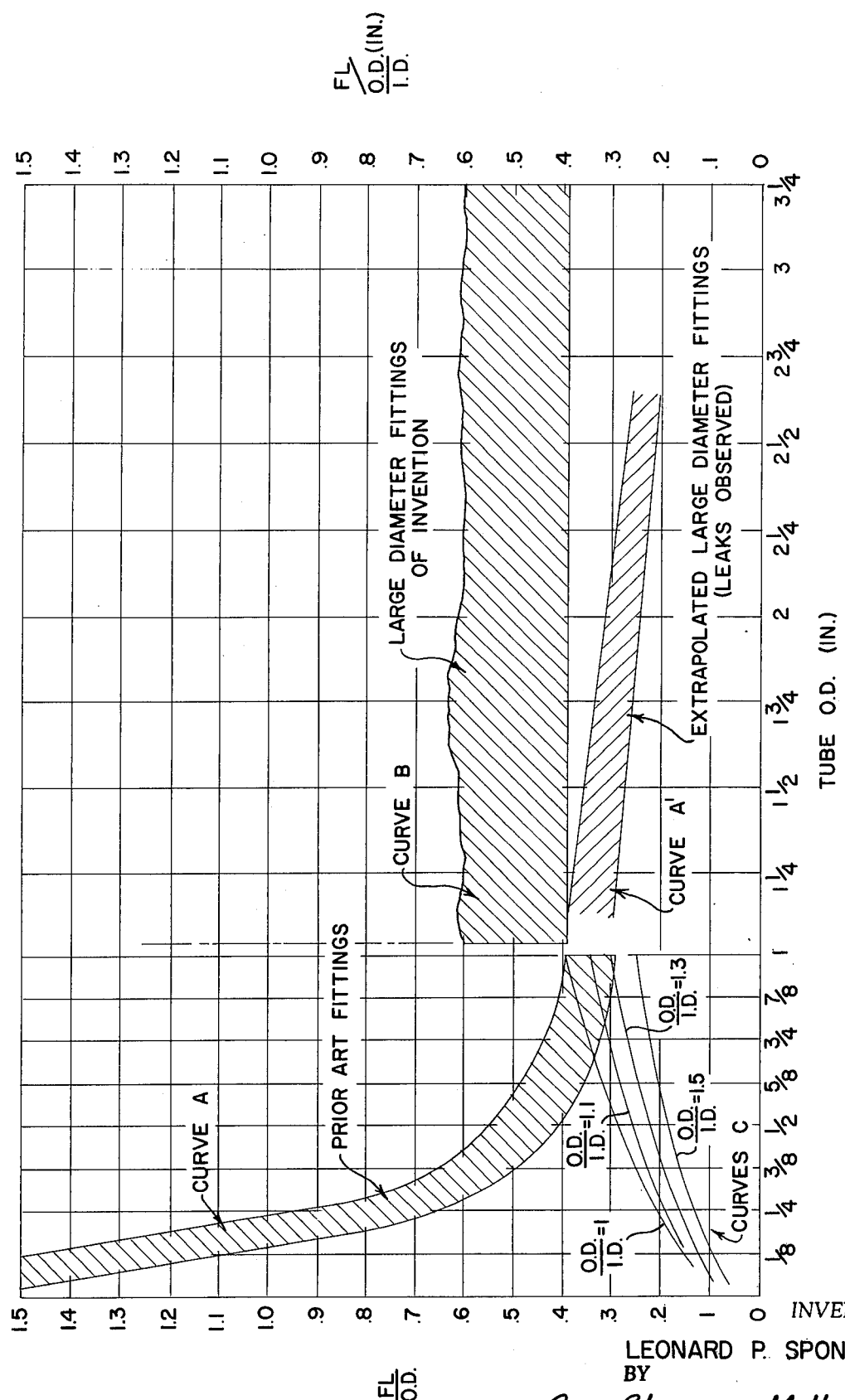
FIG. 5 is a graph showing the relationship of front ferrule length to tube diameter.

Turning now to FIG. 5 there is shown a graphical representation of the relationship between front ferrule axial length and the outside diameter of a tube adapted to be received by the fitting. It will be noted from FIG. 5 that prior art two ferrule fittings of the Crawford Fitting Company, the assignee of the invention described herein, (those fittings adapted to receive tubes having an outside diameter of 1 inch and less) have employed front ferrules having varying front ferrule length to O.D. (FL/O.D.) ratios as represented by the cross-hatched area of curve A. The front ferrule length to O.D. ratio has varied in prior art two ferrule fittings from approximately 1.5 to approximately 0.30.

From a study of the graphical representation of prior art two ferrule fittings (curve A) as shown in FIG. 5, one might consider that a simple extrapolation of the values represented could produce data to design large diameter fittings of acceptable quality. Such an extrapolation of prior art fitting values is shown in FIG. 5 as curve A'.

Curves A and A' taken together represent a front ferrule length to tube O.D. relationship dictated by the physical requirements of ferrule and tube deformation necessary to grip the tube.

It has been found through experience, however, that a calculation of front ferrule length based upon an extrapolation of the prior art fitting values does not produce large diameter fittings of acceptable quality in that leakae in some fittings has been found to occur. Stated another way, the front ferrule length to tube O.D. relationship as shown in curve A' is not satisfactory for all tube walls.

The reasons for the failure of certain large diameter fittings designed on the basis of extrapolated data (curve A' data) have been studied. It is now known that in certain fittings where leaks were observed there was an interaction of the back ferrule with the wave produced by the front ferrule with the result that effective sealing of the tube by the front ferrule and effective gripping of the tube by the back ferrule were impaired.

As previously discussed wave interference results when the front ferrule length is calculated without regard to the length of the wave induced in the tube by such ferrule. As wave length increases the length of the front ferrule must also increase. Such wave length increases as tube O.D. increases and the tube O.D./I.D. ratio decreases it will be evident that relatively long waves will be placed in large diameter thin wall tubes. Such tubes therefore require relatively long front ferrules.

Since the extrapolated data of curve A' (FIG. 5) is based on tube grip considerations extending from experience gained with smaller fittings, and since such extrapolated data does not take into account wave action and the relationship of front ferrule length to wave length, the reason for the failure of certain extrapolated fitting designs can be understood.

Through testing and analysis it has been determined that for optimum performance over all wall ratios, the front ferrule should have an axial length of approximately one-half of O.D. Thus if a fitting is to accept all wall ratios (including thin wall ratios where O.D./I.D. is close to 1) the front ferrule should have an axial length of approximately one-half of O.D. This relationship provides for optimum performance assuming the worst possible condition, an infinitely thin wall. In practice, however, the tube wall ratio will exceed 1 and thus the front ferrule length may be less than one-half of O.D. The lower limit of front ferrule length will depend on several factors including the wall ratio of the tube and the extent to which the back ferrule grips the tube. Since this invention is concerned with relatively thin wall, large diameter tubes the lower limit of front ferrule length has been established as approximately ⅜ of O.D.

It should be understood, however, that a measure of performance is achievable with front ferrule lengths less than ⅜ of O.D.

Curve B of FIG. 5 represents a front ferrule length to tube O.D. relationship for relatively thin wall tubes wherein such front ferrule is provided with sufficient length to isolate the wave induced in the tube by such ferrule from interaction with the back ferrule. Curve B provides for a minimum front ferrule length to tube O.D. ratio of approximately ⅜ or 0.375. Optimum ferrule length is reached when the FL/O.D. ratio is approximately 0.500. While a FL/O.D. ratio in excess of 0.500 serves no useful purpose insofar as the problems discussed above, nonetheless FL/O.D. ratios in excess of 0.500 should be considered within the scope and spirit of this invention.

Briefly summarizing, the design of a large diameter fitting requires a front ferrule length to tube O.D. relationship that satisfies two conditions:

1. the front ferrule must be of such a length to provide for an adequate grip of the tube, and
2. the front ferrule must be sufficiently long such that there is no interaction of the back ferrule with the wave induced in the tube by the front ferrule.

Curves A and A' of FIG. 5 satisfy condition (1) above. Curve A' does not satisfy condition (2) where relatively large thin wall tubes are used since the wave length in such tubes is relatively long due to the relatively high tube O.D. and relatively low tube O.D./I.D. ratio. Curve B on the other hand, does satisfy condition (2) for relatively large thin wall tubes since the front ferrule length is increased to accommodate the longer wave length induced in such tube.

The intersection of curve B with curves A and A' of FIG. 5 represents the point at which both conditions (1) and (2) above are satisfied where thin wall tubing is used. This intersection point is approximately at at tube O.D. of 1 inch.

This invention, therefore, is directed to those tube fittings where the tube O.D. is relatively large (in excess of 1 inch) and where the tube O.D./I.D. ratio is relatively small. This invention provides for a front ferrule length to tube O.D. ratio of approximately ⅜ or greater with optimum performance at a FL/O.D. ratio of ½.

From an examination of curve A of FIG. 5 it will be seen that small diameter fittings of the prior art have provided front ferrule length to tube O.D. ratios in excess of ⅜. In this regard it should be noted that the ferrule length of a small diameter fitting is dictated in part by manufacturing considerations such as machinery practices, etc. In the larger sizes, ferrule length is based primarily on design considerations.

In order to distinguish the fittings of this invention from the fittings of the prior art, and to more precisely identify the large diameter fittings of this invention as compared to small diameter fittings of the prior art, a secondary plot has been made in FIG. 5 of the front ferrule length to O.D./I.D. ratio as a function of tube O.D. The axis of ordinates of the secondary plot is shown to the right of FIG. 5.

Curves C of FIG. 5 show the relationship of the front ferrule length to O.D./I.D. ratio as a function of tube O.D. (for tube O.D. less than 1 inch) for constant O.D./I.D. ratios of 1.5, 1.3, 1.1 and 1. Curves C show that as the O.D. increases, the FL/(O.D./I.D.) ratio also increases. Curves C also show that as the O.D./I.D. ratio approaches 1 the FL/(O.D./I.D.) ratio increases.

It should be noted that an O.D./I.D. ratio of exactly 1 is theoretical since a tube wall in such an instance would have no thickness. The O.D./I.D. = 1 curve of FIG. 5, however, is shown since it represents the theoretical maximum value of the FL/(O.D./I.D.) ratio as the tube wall gets progressively thinner.

From a practical consideration the O.D./I.D. = 1.1 curve of FIG. 5 represents a workable thin wall tube wall ratio. The O.D./I.D. = 1.1 curve of FIG. 5 shows that the maximum value of FL/(O.D./I.D.) (with an O.D./I.D. = 1.1) for prior art fittings is approximately 0.350.

The fittings of this invention, therefore, may be said to lie within the cross-hatched area of the curve B of FIG. 5 which is the area above the FL/O.D. = 0.375 line (FL = ⅜ of O.D.). Further, in order to distinguish the fittings of this invention from smaller diameter prior art fittings, curve B encompasses only those fittings in which the FL/(O.D./I.D.) ratio of the fitting exceeds 0.375. Thus curve B extends approximately from a tube O.D. of 1 inch to all larger sizes.

Operation

The operation of the invention will now be described with reference to two (2) modes of make-up of the fitting.

Ferrule Deformation Induced by the Fitting

Presuming that the fitting is of a size that the ferrules may be deformed by the fitting camming mouth during make-up of the fitting by means of hand tools, the ferrules 44, 46 are initially positioned as shown in FIG. 1 with coupling nut 34 advanced over the coupling body 12 a distance sufficient to impose a finger-tight load on the ferrules. Thereafter, tube 26 is inserted into the coupling nut and coupling body a distance sufficient to permit the end of the tube to be seated against the shoulder 20. Upon initial torquing of coupling nut 34, a longitudinal thrust will be impaired to back ferrule 46 by means of thrust surface 40. Back ferrule 46 will in turn exert a substantially axial thrust against the front ferrule 44. Front ferrule 44 consequently will be forced into engagement with camming mouth 28 at the curved apical zone 62. As a consequence of further torquing of the coupling nut, the nose portion 52 of the front ferrule will be progressively wedged or cammed inwardly into engagement with the exterior surface of tube 26.

With further torquing of coupling nut 34 the front ferrule 44 continues to move forwardly and inwardly, but at a reduced rate as a result of the increasing resistance imposed by the surface of tube 26 and camming mouth 28. As resistance to movement of front ferrule 44 continues to build-up and the rate of front ferrule deformation slows, the stiffness of the relatively short nose portion of back ferrule 46 is gradually overcome, as a result of which a progressive inward wedging or camming of the nose portion 78 of the back ferrule into engagement with the surface of tube 26 is commenced.

In the illustrated embodiment of FIG. 1, a fitting has been shown requiring approximately one and a fraction turns of the coupling nut 34 to make-up of the fitting. The number of turns required is dependent upon many factors such as the pressures with which the fitting is to be used and the lead of the threads 30, 32.

The action of the ferrules just described is sequential in nature providing for timed and coordinated gripping by the front and back ferrules during make-up.

Ferrule Deformation Induced by a Power Operated Ferrule Setting Apparatus

Where it is desired to deform the ferrules onto the tube by means of a power operated ferrule setting apparatus prior to make-up of the fitting, it is first necessary to mount the coupling nut 34 and the ferrules 44, 46 on the tube. Thereafter, the forward end of the tube is disposed in the recess of the ferrule setting apparatus and the coupling nut is threaded onto the end portion of the tube receiving sleeve of such apparatu until it is finger tight. Upon application of power, a camming mouth of the ferrule setting apparatus is engaged by the tapered external forward surface portion 60 of the front ferrule 44 causing the ferrules to defomr into engagement with the tube. Thereafter, the tube (including the ferrules deformed thereon and the coupling nut disposed behind the ferrules) is removed from the ferrule setting apparatus. Make-up of the fitting is completed as the tube is inserted into the coupling body and the coupling nut is threadedly advanced thereon until the fitting is fully made-up.

For a more complete description of the elements and operation of the ferrule setting apparatus reference is made to U.S. Pat. Nos. 3,691,604; 3,722,064 and 3,728,771 assigned to Crawford Fitting Company.

Having described two methods by which the ferrules may be deformed into sealing engagement with the tube, it should be understood that this invention is not limited to the particular structure or sequence by which the ferrules are deformed. Rather, within the spirit of the invention should be considered alternate methods and apparatus for deforming ferrules known to those skilled in the art.

The invention claimed is:

1. A tube joint comprising in combination:
   a large diameter tube having an outside diameter O.D. and an inside diameter I.D., said outside diameter O.D. having a dimension greater than 1 inch;
   a coupling body having a bore, a counterbore which receives said tube, and a rearwardly opening camming mouth which surrounds said tube with said tube inserted in said coupling body;
   a front ferrule received upon said tube and having a nose portion, the rearward end of said front ferrule having a camming mouth;
   a back ferrule received upon said tube adjacent said front ferrule and rearwardly thereof, said back ferrule having a nose portion and a back face;
   a coupling nut threadedly engaged with said coupling body and provided with a thrust surface disposed in axially spaced opposition to said camming mouth of said coupling body and engaging said back face of said back ferrule, said coupling nut and camming mouth of said coupling body together defining an annular chamber which surrounds said tube with said tube inserted in said coupling body and within which said front and back ferrules are received;
   said front and back ferrules being deformed inwardly into gripping engagement with said tube through engagement of said nose portion of said front ferrule with said camming mouth of said coupling body and said nose portion of said back ferrule with said camming mouth of said front ferrule, each of said ferrules forming a wave in said tube;
   the relationship of said front ferrule to said tube being such that the axial length of said front ferrule is at least approximately $\frac{3}{8}$ of O.D. of said tube and the ratio of the front ferrule length to the O.D./I.D. ratio of said tube is at least approximately 0.375 inches; whereby
   the waves induced in said tube by said front ferrule is not encountered by said nose portion of said back ferrule.

2. The tube fitting of claim 1 in which said front ferrule is defined by a nose portion including a conical frustum and an intermediate cylindrical portion, and a body portion, said camming mouth of said front ferrule being provided at the rearward end of said body portion.

3. The tube fitting of claim 2 in which the outer surface of said body portion is slightly convex in section.

4. The tube fitting of claim 2 in which the radial thickness of said body portion is approximately twice the radial thickness of said intermediate cylindrical portion.

5. The tube fitting of claim 2 in which the axial length of said nose portion exceeds the axial length of said body portion.

6. A tube joint for large diameter tubes having an outside diameter O.D. in excess of 1 inch and an inside diameter I.D., said joint comprising in combination:
   a large diameter tube having an outside diameter O.D. and an inside diameter I.D., said outside diameter O.D. having a value in excess of 1 inch;
   a coupling body having a bore, a counterbore which receives said tube and a rearwardly opening camming mouth which surrounds said tube with said tube inserted in said coupling body;
   a front ferrule received upon said tube and having a nose portion, the rearward end of said front ferrule having a camming mouth;
   a back ferrule received upon said tube adjacent said front ferrule and rearwardly thereof said back ferrule having a nose portion and a back face;
   a coupling nut threadedly engaged with said coupling body and provided with a thrust surface disposed in axially spaced opposition to said camming mouth of said coupling body and engaging said back face of said back ferrule, said coupling nut and said camming mouth of said coupling body together defining an annular chamber which surrounds said tube with said tube inserted in said coupling body, and within which said front and back ferrules are received;
   said front ferrule being deformed inwardly into gripping engagement with said tube through the interaction of said nose portion of said front ferrule and said camming mouth of said coupling body, said back ferrule being deformed inwardly into gripping engagement with said tube through the interaction of said nose portion of said back ferrule and said camming mouth of said front ferrule, each of said ferrules forming an indentation in said tube;
   the relationship of said front ferrule to said tube being such that the axial length of said front ferrule is at least $\frac{3}{8}$ of O.D. of said tube; whereby
   the respective indentations produced in said tube by the respective front and back ferrules do not interact with one another.

7. A tube joint comprising in combination:

a large diameter thin wall having an outside diameter O.D. and an inside diameter I.D., said outside diameter O.D. having a dimension in excess of 1 inch and the O.D./I.D. ratio of said tube being relatively close to 1;

a coupling body having a bore, a counterbore which receives said tube, and a rearwardly opening camming mouth which surrounds said tube with said tube inserted in said coupling body;

a front ferrule received upon said tube and having a nose portion, the rearward end of said front ferrule having a camming mouth;

a back ferrule received upon said tube adjacent said front ferrule and rearwardly thereof, said back ferrule having a nose portion and a back face;

a coupling nut threadedly engaged with said coupling body and provided with a thrust surface disposed in axially spaced opposition to said camming mouth of said coupling body and engaging said back face of said back ferrule, said coupling nut and camming mouth of said coupling body together defining an annular chamber which surrounds said tube with said tube inserted in said coupling body and within which said first and back ferrules are received;

said front and back ferrules being deformed inwardly into gripping engagement with said tube, each ferrule forming a wave in said tube;

the relationship of said front ferrule to said tube being such that the axial length of said front ferrule is sufficiently long, because at least approximately ⅜ of O.D. of said tube, such that the wave induced in said tube by said front ferrule does not interact with the wave induced in said tube by said back ferrule.

8. The invention of claim 7 in which the axial length of said front ferrule is approximately one-half of O.D.

9. A method of joining a large diameter relatively thin walled tube to a coupling body comprising the steps of:

a. providing a large diameter relatively thin walled tube having an outside diameter O.D. and an inside diameter I.D., the outside diameter O.D. having a value in excess of 1 inch with the O.D./I.D. ratio of said tube being relatively close to 1;

b. providing a coupling body having a bore, a counterbore which is adapted to receive said tube, and a rearwardly opening camming mouth which is adapted to surround said tube when inserted in said coupling body;

c. providing a front ferrule adapted to be snugly received upon said tube and having a nose portion, the rearward end of said front ferrule having a camming mouth, the relationship of said front ferrule to said tube being such that the axial length of said front ferrule is at least approximately ⅜ of O.D. of said tube;

d. providing a back ferrule adapted to be snugly received upon said tube adjacent said front ferrule and rearwardly thereof, said back ferrule having a nose portion and a back face;

e. providing a coupling nut adapted to be threadedly engaged with said coupling body and provided with a thrust surface adapted to be disposed in axially spaced opposition to said camming mouth of said coupling body and adapted to engage said back face of said back ferrule, said coupling nut and camming mouth of said coupling body adapted to define an annular chamber which surrounds said tube when inserted in said coupling body and within which said front and back ferrules are adapted to be received;

f. inserting said front ferrule and said back ferrule within said coupling body;

g. advancing said coupling nut over said coupling body;

h. inserting said tube into said coupling nut and said coupling body such that said ferrules are received on said tube;

i. torquing said coupling nut to impart a longitudinal thrust to said back ferrule as well as a substantially axial thrust against said front ferrule as a consequence of which the nose portion of said front ferrule is progressively wedged inwardly into engagement with the exterior surface of said tube thereby forming a wave in said tube and progressive inward wedging of said nose portion of said back ferrule forces said back ferrule into engagement with the surface of said tube causing a secondary wave to be defined in said tube to provide for gripping of said tube by said ferrules; whereby, the axial length of said front ferrule is sufficiently long to isolate the wave induced in said tube by said front ferrule from the wave induced in said tube by said back ferrule.

10. A method of joining a large diameter relatively thin walled tube to a coupling body comprising the steps of:

a. providing a large diameter relatively thin walled tube having an outside diameter O.D. and an inside diameter I.D., the outside diameter O.D. having a value in excess of 1 inch with the O.D./I.D. ratio of said tube being relatively close to 1;

b. providing a coupling body having a bore, a counterbore which is adapted to receive said tube, and a rearwardly opening camming mouth which is adapted to surround said tube when inserted in said coupling body;

c. providing a front ferrule adapted to be snugly received upon said tube and having a nose portion, the rearward end of said front ferrule having a camming mouth, the relationship of said front ferrule to said tube being such that the axial length of said front ferrule is at least approximately ⅜ of O.D. of said tube;

d. providing a back ferrule adapted to be snugly received upon said tube adjacent said front ferrule and rearwardly thereof, said back ferrule having a nose portion and a back face;

e. providing a coupling nut adapted to be threadedly engaged with said coupling body and provided with a thrust surface adapted to be disposed in axially spaced opposition to said camming mouth of said coupling body and adapted to engage said back face of said back ferrule, said coupling nut and camming mouth of said coupling body adapted to define an annular chamber which surrounds said tube when inserted in said coupling body and within which said front and back ferrules are adapted to be received;

f. placing said front ferrule and said back ferrule about said tube with said front ferrule ahead of said back ferrule;

g. deforming said front and back ferrules into gripping engagement with said tube, each of said ferrules forming a wave or indentation in said tube;

h. inserting said tube with said ferrules deformed thereon into said coupling body;

i. advancing said coupling nut into engagement with said coupling body thereby to complete makeup of said joint; whereby, the axial length of said front ferrule is sufficiently large to isolate the wave induced in said tube by said front ferrule from the wave induced in said tube by said back ferrule.

11. A method of joining a large diameter, relatively thin walled tube to a coupling body comprising the steps of:

a. providing a large diameter relatively thin walled tube having an outside diameter O.D. and an inside diameter I.D., the outside diameter O.D. having a value in excess of 1 inch with the O.D./I.D. ratio of said tube being relatively close to 1;

b. providing a coupling body having a bore, a counterbore which is adapted to receive said tube, and a rearwardly opening camming mouth which is adapted to surround said tube when inserted in said coupling body;

c. providing a front ferrule adapted to be snugly received upon said tube and having a nose portion, the rearward end of said front ferrule having a camming mouth, the relationship of said front ferrule to said tube being such that the axial length of said front ferrule is at least approximately ⅜ of O.D. of said tube and the ratio of the front ferrule length to the O.D./I.D. ratio of said tube is at least approximately 0.375 inches;

d. providing a back ferrule adapted to be snugly received upon said tube adjacent said front ferrule and rearwardly thereof, said back ferrule having a nose portion and a back face;

e. providing a couplng nut adapted to be threadedly engaged with said coupling body and provided with a thrust surface adapted to be disposed in axially spaced opposition to said camming mouth of said coupling body and adapted to engage said back face of said back ferrule, said coupling nut and camming mouth of said coupling body adapted to define an annular chamber which surrounds said tube when inserted in said coupling body and within which said front and back ferrules are adapted to be received;

f. placing said front ferrule and said back ferrule about said tube with said front ferrule ahead of said back ferrule;

g. deforming said front and back ferrules into gripping engagement with said tube, each of said ferrules forming a wave or indentation in said tube; whereby, the axial length of said front ferrule is sufficiently large to isolate the wave induced in said tube by said front ferrule from the wave induced in said tube by said back ferrule with the fitting in a made-up condition with said coupling nut engaged with said coupling body and said ferrules located in said annular chamber.

12. The method of claim 11 in which said front ferrule is provided with an axial length approximately one-half of O.D. of said tube.

* * * * *